United States Patent
Matsumoto et al.

(10) Patent No.: US 9,976,497 B2
(45) Date of Patent: May 22, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yosuke Matsumoto, Susono (JP); Noriyasu Adachi, Numazu (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 115 days.

(21) Appl. No.: 15/113,241

(22) PCT Filed: Dec. 16, 2014

(86) PCT No.: PCT/JP2014/083815
§ 371 (c)(1),
(2) Date: Jul. 21, 2016

(87) PCT Pub. No.: WO2015/111337
PCT Pub. Date: Jul. 30, 2015

(65) Prior Publication Data
US 2016/0369712 A1   Dec. 22, 2016

(30) Foreign Application Priority Data
Jan. 23, 2014 (JP) ................... 2014-010471

(51) Int. Cl.
*F02M 25/07* (2006.01)
*F02D 33/02* (2006.01)
(Continued)

(52) U.S. Cl.
CPC ..... *F02D 41/0002* (2013.01); *F02D 41/0052* (2013.01); *F02D 41/0057* (2013.01);
(Continued)

(58) Field of Classification Search
CPC ........... F02D 41/0002; F02D 41/0052; F02D 41/3064; F02D 41/0057; F02D 41/0017;
(Continued)

(56) References Cited

U.S. PATENT DOCUMENTS 5,727,528 A * 3/1998 Hori ................... F02D 41/0072
123/486
6,089,206 A * 7/2000 Suzuki ................. F02D 41/307
123/295

(Continued)

FOREIGN PATENT DOCUMENTS

DE        10107160 A1 *  8/2001  ........ F02D 41/0057
JP      H06-257487 A      9/1994
(Continued)

*Primary Examiner* — Hieu T Vo
*Assistant Examiner* — Arnold Castro
(74) *Attorney, Agent, or Firm* — Hunton Andrews Kurth LLP

(57) ABSTRACT

In an internal combustion engine an air-fuel ratio is switched between at least two target values without generating torque fluctuations, while a deterioration in fuel consumption performance and exhaust performance is suppressed. When a condition for switching a combustion mode from stoichiometric combustion to lean combustion and a condition that the amount of change in a target torque is less than or equal to a predetermined value are satisfied, a target EGR rate is increased towards an EGR limit prior to switching the target air-fuel ratio. The target air-fuel ratio is maintained at the stoichiometric air-fuel ratio until the target EGR rate reaches the EGR limit, and in response to the target EGR rate reaching the EGR limit, the target air-fuel ratio is changed towards a lean air-fuel ratio.

8 Claims, 4 Drawing Sheets

(51) Int. Cl.

| | | |
|---|---|---|
| *F02D 11/10* | (2006.01) | |
| *F02D 41/20* | (2006.01) | |
| *F02P 5/15* | (2006.01) | |
| *F02D 41/00* | (2006.01) | |
| *F02M 26/45* | (2016.01) | |
| *F02M 26/51* | (2016.01) | |
| *F02M 26/53* | (2016.01) | |
| *F02D 41/30* | (2006.01) | |

(52) U.S. Cl.
CPC ......... *F02D 41/3064* (2013.01); *F02M 26/45* (2016.02); *F02M 26/51* (2016.02); *F02M 26/53* (2016.02); *F02D 41/307* (2013.01); *F02D 41/3029* (2013.01); *F02D 2041/0017* (2013.01); *F02D 2250/21* (2013.01); *F02D 2250/36* (2013.01); *F02P 5/1504* (2013.01); *Y02T 10/42* (2013.01); *Y02T 10/47* (2013.01)

(58) Field of Classification Search
CPC ............... F02D 41/3029; F02D 41/307; F02D 2250/21; F02D 2250/36; F02M 26/45; F02M 26/53; F02P 5/1504; Y02T 10/42; Y02T 10/47
See application file for complete search history.

(56) References Cited

U.S. PATENT DOCUMENTS

| | | | |
|---|---|---|---|
| 6,715,474 B1* | 4/2004 | Sasaki | F02D 41/0057 123/568.21 |
| 7,513,245 B2* | 4/2009 | Morimoto | F02D 41/0055 123/568.11 |
| 2002/0124831 A1* | 9/2002 | Kondo | F02D 13/0215 123/406.47 |
| 2003/0116123 A1* | 6/2003 | Ito | F02D 41/0057 123/299 |
| 2008/0140298 A1* | 6/2008 | Morimoto | F02D 41/0055 701/103 |
| 2009/0312936 A1* | 12/2009 | Kakuya | F02D 13/0207 701/103 |
| 2016/0090929 A1* | 3/2016 | Tanaka | F02D 41/12 123/406.52 |
| 2016/0312722 A1* | 10/2016 | Nogi | F02D 41/0275 |

FOREIGN PATENT DOCUMENTS

| | | |
|---|---|---|
| JP | H06-264786 A | 9/1994 |
| JP | 2002-089320 A | 3/2002 |
| JP | 2004197642 A | 7/2004 |

* cited by examiner

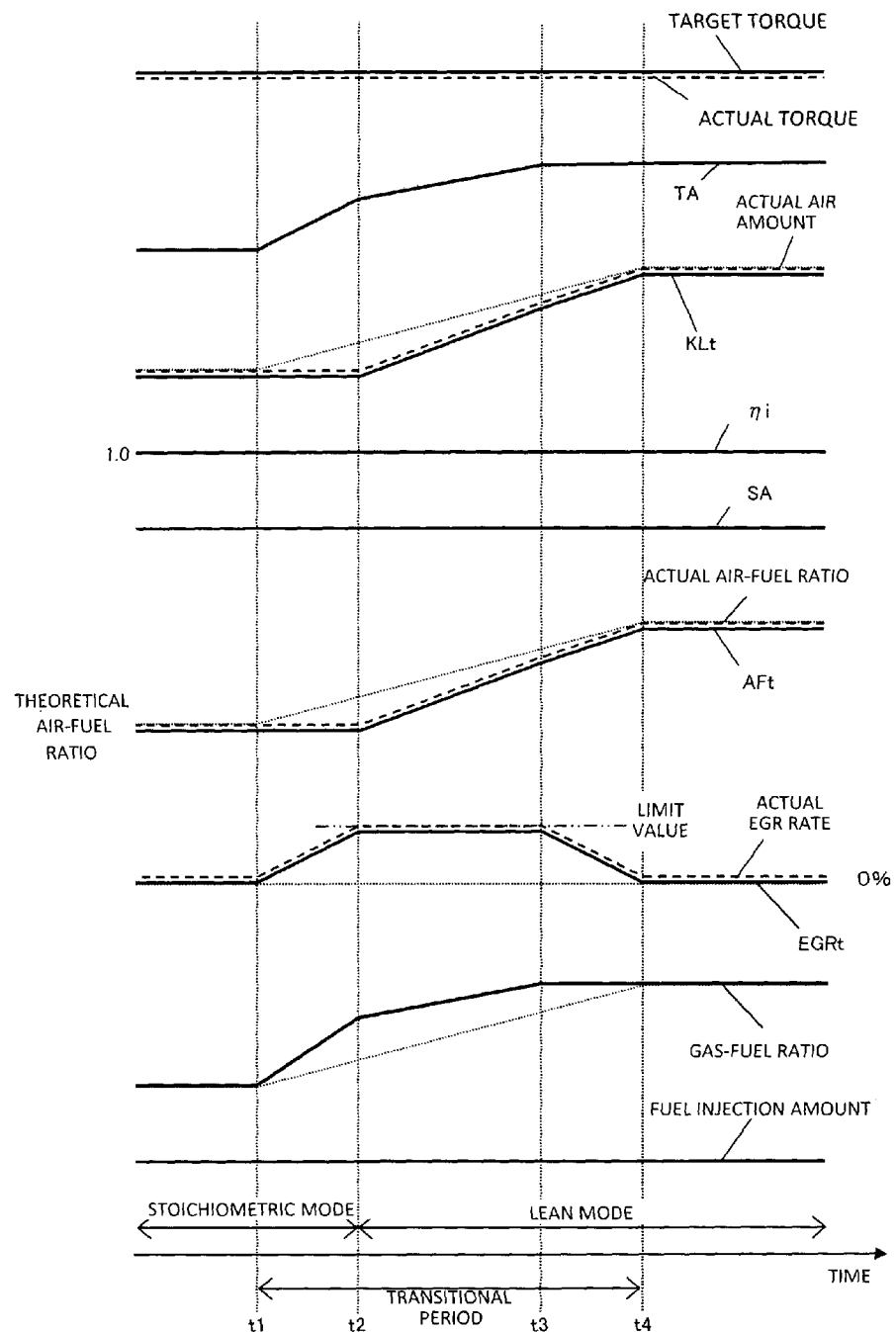

CONTROL DEVICE FOR INTERNAL COMBUSTION ENGINE

CROSS-REFERENCE TO RELATED APPLICATIONS

This is a national phase application based on the PCT International Patent Application No. PCT/JP2014/083815 filed Dec. 16, 2014, claiming priority to Japanese Patent Application No. 2014-010471 filed Jan. 23, 2014, the entire contents of both of which are incorporated herein by reference.

FIELD OF THE INVENTION

The present invention relates to a control device that performs integrated control of an air amount, a fuel supply amount, and an ignition timing of an internal combustion engine that is configured to be capable of switching an air-fuel ratio that is used for operation between at least two target air-fuel ratios.

BACKGROUND ART

Japanese Patent Laid-Open No. 2002-89320 discloses technology (hereunder, referred to as "prior art") relating to air-fuel ratio switching control in an internal combustion engine that is capable of switching the operational air-fuel ratio of the internal combustion engine between a lean air-fuel ratio and a stoichiometric air-fuel ratio. According to the aforementioned prior art, when switching the air-fuel ratio from the lean air-fuel ratio to the stoichiometric air-fuel ratio, operations are performed so that the air-fuel ratio is gradually switched after starting operation of a throttle valve. Since switching of the air-fuel ratio is thereby performed in correspondence with control of the throttle valve, variations in the fuel control are suppressed and fluctuations in the engine output torque are prevented.

CITATION LIST

Patent Literature

[Patent Literature 1]
  Japanese Patent Laid-Open No. 2002-89320
[Patent Literature 2]
  Japanese Patent Laid-Open No. 6-264786
[Patent Literature 3]
  Japanese Patent Laid-Open No. 6-257487

SUMMARY OF INVENTION

Technical Problem

If the air-fuel ratio is gradually changed when switching the air-fuel ratio, as in the above described prior art, the air-fuel ratio can be switched without performing ignition retardation control. However, if the air-fuel ratio is gradually changed from the stoichiometric air-fuel ratio to a lean air-fuel ratio, an increase in the amount of NOx emissions will become a problem. That is, there is a tendency for the amount of NOx emissions to reach a peak at a slightly lean air-fuel ratio of around 16, and thereafter decrease as the air-fuel ratio changes to a lean air-fuel ratio. Consequently, if the air-fuel ratio is gradually changed from the stoichiometric air-fuel ratio to a lean air-fuel ratio, the air-fuel ratio must pass through an air-fuel ratio region in which the amount of NOx emissions is large, and consequently a deterioration in the exhaust performance becomes a problem.

Therefore, when switching the air-fuel ratio, it is conceivable to adopt a configuration that skips the air-fuel ratio region in which the amount of NOx emissions is large by changing the air-fuel ratio in a step manner from the stoichiometric air-fuel ratio to the lean air-fuel ratio. According to this technology, after an air amount that corresponds to a lean air-fuel ratio is realized, the air-fuel ratio can be switched from the stoichiometric air-fuel ratio to a lean air-fuel ratio, and a torque level difference corresponding to a change in the air amount can be suppressed by retardation control with respect to the ignition timing. However, the possibility that fuel consumption will decrease accompanies retardation of the ignition timing. In particular, because a lean limit in lean-burn engines of recent years has increased, the difference in the required air amount between a stoichiometric air-fuel ratio and a lean air-fuel ratio has become extremely large. Therefore, when the above described prior art is applied to such lean-burn engines and it is attempted to suppress a torque level difference that is caused by a difference in air amounts by means of the ignition timing, there is a possibility that it will be necessary to continue a state in which the ignition timing is retarded by a large margin for an extended period, and there is thus a risk that a deterioration in the fuel consumption performance and the influence on the catalyst will be of an extent that cannot be overlooked.

The present invention has been conceived in view of the above described problems, and an object of the present invention is, in an internal combustion engine that is configured to be capable of switching an air-fuel ratio that is used for operation between at least two target air-fuel ratios, to switch the air-fuel ratio without generating fluctuations in the torque, and to also suppress a deterioration in the fuel consumption performance and a deterioration in the exhaust performance at the time of switching.

Solution to Problem

To solve the above problem, a first aspect of the present invention is a control device for an internal combustion engine that is configured to be capable of selecting operation according to a first air-fuel ratio and operation according to a second air-fuel ratio that is leaner than the first air-fuel ratio, comprising:

first means for, in a case where a condition for switching an operation mode from the operation according to the first air-fuel ratio to the operation according to the second air-fuel ratio is satisfied, controlling the internal combustion engine so as to increase an EGR rate in a continuous manner up to a switching-time target EGR rate; and second means for, in a case where the condition is satisfied, controlling the internal combustion engine so as to maintain an air-fuel ratio at the first air-fuel ratio until the EGR rate reaches the switching-time target EGR rate, and in response to the EGR rate reaching the switching-time target EGR rate, to cause the air-fuel ratio to change in a continuous manner from the first air-fuel ratio towards the second air-fuel ratio.

A second aspect of the present invention is the control device for an internal combustion engine according to the first aspect, wherein the first means comprises means for controlling the internal combustion engine so that, in response to a gas-fuel ratio reaching an equal value to a value of the second air-fuel ratio, the internal combustion engine causes the EGR rate to decrease in a continuous manner from the switching-time target EGR rate while maintaining the gas-fuel ratio at the value of the second air-fuel ratio.

A third aspect of the present invention is the control device for an internal combustion engine according to the first aspect, wherein:

the second means comprises:

target air-fuel ratio switching means for switching a target air-fuel ratio from the first air-fuel ratio to the second air-fuel ratio in response to the condition being satisfied, target air amount calculation means for back-calculating a target air amount for achieving a target torque based on the target air-fuel ratio from the target torque, first actuator control means for determining an operation amount of a first actuator that changes an amount of air that is drawn into a cylinder based on the target air amount, and operating the first actuator in accordance with the operation amount, and second actuator control means for determining a fuel supply amount based on the target air-fuel ratio, and operating a second actuator that supplies fuel into a cylinder in accordance with the fuel supply amount; and the target air-fuel ratio switching means is configured so as to, in a case where the condition is satisfied, maintain the target air-fuel ratio at the first air-fuel ratio until the EGR rate reaches the switching-time target EGR rate, and to cause the target air-fuel ratio to change in a continuous manner from the first air-fuel ratio towards the second air-fuel ratio in response to the EGR rate reaching the switching-time target EGR rate.

A fourth aspect of the present invention is the control device for an internal combustion engine according to the third aspect, wherein:

the first means comprises:

target EGR rate calculation means for calculating a target EGR rate in accordance with an operating condition of the internal combustion engine, and third actuator control means for determining an operation amount of a third actuator that adjusts the EGR rate based on the target EGR rate, and operating the third actuator in accordance with the operation amount; and the target EGR rate calculation means is configured so as to increase the target EGR rate in a continuous manner up to the switching-time target EGR rate in response to the condition being satisfied.

A fifth aspect of the present invention is the control device for an internal combustion engine according to the fourth aspect, wherein:

the target EGR rate calculation means is configured so as to decrease the target EGR rate in a continuous manner from the switching-time target EGR rate in response to a gas-fuel ratio reaching an equal value to the second air-fuel ratio; and the target air-fuel ratio switching means is configured so as to, in response to the gas-fuel ratio reaching an equal value to the second air-fuel ratio, change the target air-fuel ratio within a range from the first air-fuel ratio to the second air-fuel ratio so that the gas-fuel ratio is maintained at the second air-fuel ratio.

A sixth aspect of the present invention is the control device for an internal combustion engine according to any one of the first to fifth aspects, wherein the switching-time target EGR rate is an EGR rate that corresponds to an EGR limit.

A seventh aspect of the present invention is the control device for an internal combustion engine according to any one of the first to sixth aspects, further comprising restriction means for restricting control by the first means in a case where a condition that an amount of change in a target torque is equal to or less than a predetermined value is not satisfied.

Advantageous Effects of Invention

According to the first invention the EGR rate is increased in a continuous manner up to a switching-time target EGR rate prior to switching of the air-fuel ratio from a first air-fuel ratio to a second air-fuel ratio which is leaner than the first air-fuel ratio. The air-fuel ratio is maintained at the first air-fuel ratio until the EGR rate reaches the switching-time target EGR rate, and is then changed in a continuous manner towards the second air-fuel ratio in response to the EGR rate reaching the switching-time target EGR rate. Therefore, because the air-fuel ratio is changed in a continuous manner from the first air-fuel ratio to the second air-fuel ratio after raising the EGR rate, it is possible to effectively suppress the amount of NOx emissions when switching the combustion mode.

According to the second invention, in response to the gas-fuel ratio reaching an equal value to the second air-fuel ratio, the EGR rate is decreased while maintaining the gas-fuel ratio at the second air-fuel ratio. It is thus possible to smoothly change the air-fuel ratio from the first air-fuel ratio to the second air-fuel ratio without generating a torque level difference.

According to the third invention the target air-fuel ratio is maintained at the first air-fuel ratio until the target EGR rate reaches the switching-time target EGR rate, and is changed in a continuous manner towards the second air-fuel ratio in response to the target EGR rate reaching the switching-time target EGR rate. Therefore, because the air-fuel ratio is changed in a continuous manner from the first air-fuel ratio to the second air-fuel ratio after raising the EGR rate, it is possible to effectively suppress the amount of NOx emissions when switching the combustion mode.

According to the fourth invention the target EGR rate is increased in a continuous manner up to the switching-time target EGR rate prior to switching of the target air-fuel ratio from the first air-fuel ratio to the second air-fuel ratio. Therefore, because the air-fuel ratio is changed in a continuous manner from the first air-fuel ratio to the second air-fuel ratio after raising the EGR rate, it is possible to effectively suppress the amount of NOx emissions when switching the combustion mode.

According to the fifth invention, in response to the gas-fuel ratio reaching an equal value to the second air-fuel ratio, the EGR rate is decreased while maintaining the gas-fuel ratio at the second air-fuel ratio. It is thus possible to smoothly change the air-fuel ratio from the first air-fuel ratio to the second air-fuel ratio without generating a torque level difference.

According to the sixth invention, since the air-fuel ratio is changed in a continuous manner from the first air-fuel ratio to the second air-fuel ratio after raising the EGR rate to an EGR limit, it is possible to suppress to a maximum the amount of NOx emissions when switching the combustion mode.

According to the seventh invention, in a case where a condition that an amount of change in the target torque is less than or equal to a predetermined value is not satisfied, execution of the above described control that increases the EGR rate prior to switching of the air-fuel ratio is restricted. As a result, at a transient time at which the target torque changes at a fast rate, it is possible to avoid a situation in which a time period that is required for switching the air-fuel ratio is prolonged and the exhaust performance deteriorates.

BRIEF DESCRIPTION OF DRAWINGS

FIG. 4 is a time chart illustrating switching of the combustion mode from stoichiometric combustion to lean combustion according to the first embodiment of the present invention.

DESCRIPTION OF EMBODIMENT

First Embodiment

Hereunder, a first embodiment of the present invention is described with reference to the drawings.

An internal combustion engine (hereinafter, referred to as "engine") which is a control object in the present embodiment is a spark-ignition type, four-cycle reciprocating engine. Further, the engine is a so-called "lean-burn engine" that is constructed so as to be capable of selecting between a stoichiometric mode that performs combustion according to a theoretical air-fuel ratio (first air-fuel ratio) and a lean mode that performs combustion according to an air-fuel ratio (second air-fuel ratio) that is leaner than the theoretical air-fuel ratio as combustion modes of the engine.

An ECU (Electrical Control Unit) mounted in the vehicle controls operations of the engine by actuating various kinds of actuators that are provided in the engine. The actuators actuated by the ECU include a throttle as a first actuator that changes an air amount, an injector as a second actuator that supplies fuel into a cylinder, an EGR valve as a third actuator that adjusts an EGR rate, and an ignition device as a fourth actuator that ignites an air-fuel mixture in a cylinder. The injector is provided in an intake port. The ECU actuates these actuators to control operation of the engine. Control of the engine by the ECU includes switching the operation mode from the stoichiometric mode to the lean mode, or from the lean mode to the stoichiometric mode.

Figure 1:
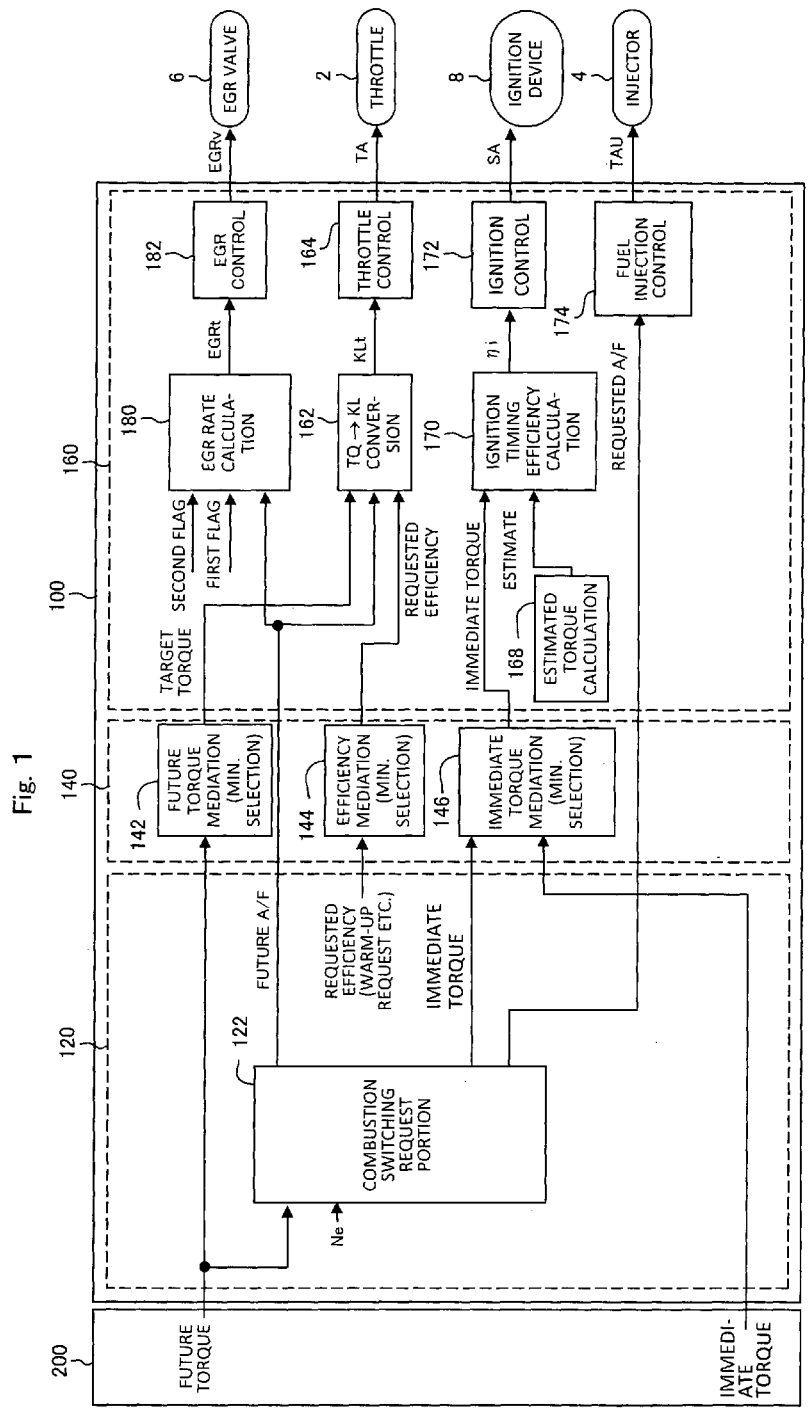
FIG. 1 is a block diagram illustrating a control structure of an ECU according to a first embodiment of the present invention.

In FIG. 1, the logic of the ECU according to the present embodiment is illustrated in a block diagram. The ECU includes an engine controller 100 and a powertrain manager 200. The engine controller 100 is a control device that directly controls the engine, and corresponds to the control device according to the present invention. The powertrain manager 200 is a control device that performs integrated control of the entire driving system that includes the engine, an electronically controlled automatic transmission, and also vehicle control devices such as a VSC and TRC. The engine controller 100 is configured to control operation of the engine based on signals received from the powertrain manager 200. The engine controller 100 and powertrain manager 200 are each realized by software. More specifically, the respective functions of the engine controller 100 and the powertrain manager 200 are realized in the ECU by reading programs stored in a memory and executing the programs using a processor.

The powertrain manager 200 calculates a future torque and sends the calculated value to the engine controller 100. The term "future torque" refers to torque of a kind that, among torques that the powertrain manager 200 requests with respect to the engine, is a torque for which the responsiveness required of the engine is not high and which it is sufficient to realize in the near future and need not be realized immediately. The powertrain manager 200 calculates a requested torque based on the degree of opening of an accelerator pedal.

The powertrain manager 200 also calculates an immediate torque and sends the calculated value to the engine controller 100. The term "immediate torque" refers to torque of a kind that, among torques that the powertrain manager 200 requests with respect to the engine, is a torque for which the urgency or priority is higher than the future torque and for which a high responsiveness is required of the engine. That is, the immediate torque is of a kind which is required to be realized immediately. The immediate torque includes torques that are requested from a vehicle control system, such as a torque requested for transmission control of the electronically controlled automatic transmission, a torque requested for traction control, and a torque requested for sideslip prevention control. The powertrain manager 200 outputs a valid value that is in accordance with the size of the torque that it is desired to realize only in a case where an event has actually arisen in which such a torque is required. During a period in which such an event does not arise the powertrain manager 200 outputs an invalid value, that is, a value that is larger than the maximum shaft torque that the engine can output.

Next, the configuration of the engine controller 100 will be described. The configuration of the engine controller 100 is broadly divided into a function portion 120, a mediation portion 140, and an implementation portion 160.

The function portion 120 calculates and outputs various control parameters with respect to the engine. The control parameters include parameters that are calculated based on a requested value that is sent from the powertrain manager 200, and parameter that are calculated within the function portion 120 based on information relating to the operating state of the engine. More specifically, a future torque, a future air-fuel ratio (future A/F), a requested efficiency, a first immediate torque, a second immediate torque, and a requested air-fuel ratio (requested A/F) are calculated as control parameter. Among these, a future torque that is sent from the powertrain manager 200 is used as it is as the future torque, and an immediate torque that is sent from the powertrain manager 200 is used as it is as the second immediate torque. The requested efficiency is a requested value of the ignition timing efficiency, and is a control parameter that is used to calculate a target air amount. The requested efficiency is set to 1 which is the maximum value thereof in a case where high efficiency operation by means of MBT control is required, and the requested efficiency is set to a value less than 1 in a case where low efficiency operation is required in order to warm-up a catalyst. The future air-fuel ratio, first immediate torque, and requested air-fuel ratio are calculated with a combustion switching request portion 122 that is included in the function portion 120.

Figure 2:
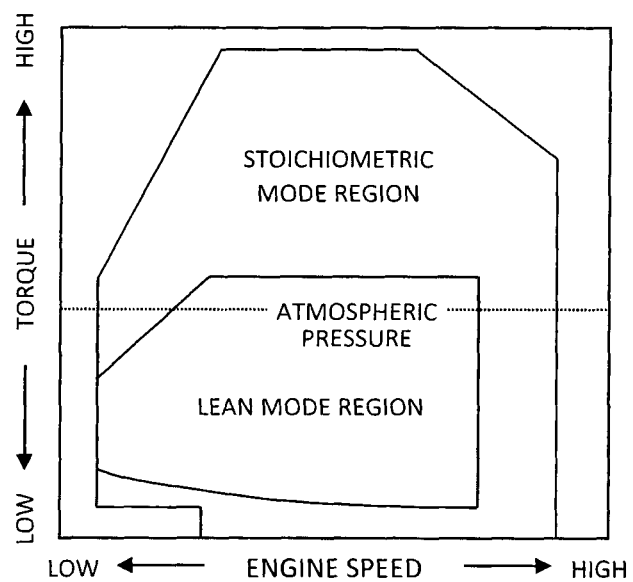
FIG. 2 is a view illustrating settings of operating ranges adopted by the ECU according to the first embodiment of the present invention.

The combustion switching request portion 122 makes a determination regarding switching of the combustion mode based on the future torque and an engine speed (i.e. engine revolution speed). FIG. 2 illustrates settings of operating ranges according to the present embodiment. The operating ranges are defined by the torque and the engine speed.

According to FIG. 2, a lean mode region in which the lean mode is selected is set in a low-to-medium speed and low-to-medium load region. The combustion switching request portion 122 determines the combustion mode based on the relation shown in FIG. 2, and calculates control parameters relating to each of the air amount, the ignition timing, the EGR rate and fuel injection in accordance with the determined result. The future air-fuel ratio is a control parameter relating to the air amount and EGR rate. The first immediate torque is a control parameter relating to the ignition timing. The requested air-fuel ratio is a control parameter relating to the fuel injection. The future air-fuel ratio is a parameter that provides a conversion efficiency of the air amount to torque, and is used for calculating a target air amount and a target EGR rate. A configuration is adopted so that, in a case where a condition for switching the combustion mode from stoichiometric combustion to lean combustion is satisfied, the future air-fuel ratio is switched from the theoretical air-fuel ratio to a lean air-fuel ratio. The first immediate torque is a target value of the immediate torque for switching the combustion mode, and is used for switching the calculation of the ignition timing efficiency when switching the combustion mode. Although the first immediate torque is normally an invalid value, the first immediate torque is set to an equal value to the future torque in a case where a condition for switching the combustion mode is satisfied. The requested air-fuel ratio is a control parameter relating to fuel injection, and is set to an equal value to the future air-fuel ratio. Accordingly, in a case where a condition for switching the combustion mode from stoichiometric combustion to lean combustion is satisfied, similarly to the future air-fuel ratio, the requested air-fuel ratio is switched from the theoretical air-fuel ratio to a lean air-fuel ratio.

In addition, in the combustion switching request portion 122, during a period in which calculation processing for switching the combustion mode is being executed after a condition for switching the combustion mode from stoichiometric combustion to lean combustion is satisfied, a first flag signal that indicates that switching of the combustion mode is in progress is set to "on". Further, in the combustion switching request portion 122, during a period in which an amount of change in a target torque, described later, is equal to or less than a predetermined value, a second flag signal that indicates that the operating conditions of the engine are steady is set to "on". Note that, with respect to the predetermined value that is used for the determination regarding the second flag, a predetermined threshold value can be used as an amount of change in the target torque for determining that the operating conditions of the engine are steady or the engine is in the process of gradual acceleration or deceleration. In a case where the first flag signal and second flag signal are both "on", the combustion switching request portion 122 performs characteristic switching of the combustion mode that is described later.

Control parameters that are output from the function portion 120 having the above described configuration are input to the mediation portion 140. Specifically, the mediation portion 140 includes a future torque mediation portion 142, an efficiency mediation portion 144, and an immediate torque mediation portion 146. The future torque mediation portion 142 performs a mediation process with respect to the future torque inputted from the function portion 120 and another torque in the same category as the future torque, and outputs a torque that is obtained as the result of the mediation process as a target torque with respect to the engine. Fundamentally, the target torque is the same value as the future torque. Minimum value selection is used as the mediation method in the future torque mediation portion 142.

The efficiency mediation portion 144 performs a mediation process with respect to the requested efficiency torque inputted from the function portion 120 and another efficiency in the same category as the requested efficiency torque, and outputs an efficiency that is obtained as a result of the mediation process as a final requested efficiency with respect to the engine. Minimum value selection is used as the mediation method in the efficiency mediation portion 144. From the viewpoint of fuel consumption performance, it is preferable that the ignition timing efficiency is 1 which is the maximum value thereof. Accordingly, the value of the requested efficiency that is output from the efficiency mediation portion 144 is fundamentally 1, and a value that is less than 1 is only selected in a case where an event of some kind such as a warm-up request has occurred.

The immediate torque mediation portion 146 performs a mediation process with respect to the first immediate torque inputted from the function portion 120 and the second immediate torque, and outputs an immediate torque that is obtained as the result of the mediation process as a final immediate torque with respect to the engine. Minimum value selection is used as the mediation method in the immediate torque mediation portion 146. Fundamentally, the first immediate torque and the second immediate torque are each invalid values, and are switched to a valid value showing the size of the torque it is desired to realize only in a case where a specific event has occurred. Accordingly, the immediate torque that is output from the immediate torque mediation portion 146 is also fundamentally an invalid value, and a valid value is selected in only a case where an event of some kind has occurred. In a case where a condition for switching the combustion mode has been satisfied, the first immediate torque is switched from an invalid value to the value of the future torque, to thereby make the immediate torque that is output from the immediate torque mediation portion 146 the same value as the future torque.

The target torque, the requested efficiency and the immediate torque that were obtained as the results of the respective mediation processes are outputted from the mediation portion 140 configured as described above. Further, the future air-fuel ratio, number of lean cylinders, and requested air-fuel ratio that are inputted to the mediation portion 140 from the function portion 120 are outputted as they are from the mediation portion 140.

The implementation portion 160 corresponds to an inverse model of the engine, and is constituted by a plurality of models that are represented by a map or a function. Operation amounts of the respective actuators 2, 4, 6, and 8 for coordinated operations are calculated by the implementation portion 160. The implementation portion 160 includes a plurality of arithmetic units 162, 164, 170, 172, 174, 180, and 182. Among these arithmetic units, the arithmetic units 162 and 164 relate to air amount control, the arithmetic units 170 and 172 relate to ignition timing control, the arithmetic unit 174 relates to fuel injection amount control, and the arithmetic units 180 and 182 relate to EGR control. Hereunder, the functions of the respective arithmetic units are described in detail in order, starting from the arithmetic units relating to air amount control.

The target torque, the requested efficiency and the future air-fuel ratio are inputted to the arithmetic unit 162. The arithmetic unit 162 uses the requested efficiency and the future air-fuel ratio to back-calculate a target air amount for achieving the target torque from the target torque. In this calculation, the requested efficiency and the future air-fuel ratio are used as parameters that provide a conversion efficiency of the air amount to torque. The arithmetic unit 162 first calculates a target torque for air amount control by dividing the target first torque by the requested efficiency. Next, the arithmetic unit 162 converts the target torque for air amount control to a target air amount using a torque-air amount conversion map. Actual values or target values of engine status amounts are used to search the torque-air amount conversion map. With regard to the air-fuel ratio, the future air-fuel ratio is used to search the map. Accordingly, at the arithmetic unit 162, the air amount that is required to realize the target torque for air amount control under the future air-fuel ratio is calculated as the target air amount. In the drawings, the target air amount is described as "KLt".

The arithmetic unit 164 first back-calculates a target intake pipe pressure (target Pm) that is a target value of the intake pipe pressure from the target air amount and a target EGR rate that is described later. A map that describes the relation between an air amount that is drawn into the cylinders through the intake valve and the intake pipe pressure is used to calculate the target intake pipe pressure. The relation between the air amount and the intake pipe pressure changes depending on the EGR rate. Therefore, when calculating the target intake pipe pressure, a parameter value of the aforementioned map is determined based on the current EGR rate. Next, the arithmetic unit 164 calculates a target degree of throttle opening that is a target value of the degree of throttle opening based on the target intake pipe pressure. The target degree of throttle opening is described as "TA" in the drawings. An inverse model of an air model is used to calculate the target degree of throttle opening. The air model is a physical model which is obtained as the result of modeling the response characteristic of the intake pipe pressure with respect to operation of the throttle 2. Therefore, the target degree of throttle opening that is required to achieve the target intake pipe pressure can be back-calculated from the target intake pipe pressure using the inverse model thereof. The target degree of throttle opening calculated by the arithmetic unit 164 is converted to a signal for driving the throttle 2, and the signal is sent to the throttle 2. The arithmetic units 162 and 164 correspond to first actuator control means according to the present invention.

Next, the functions of the arithmetic units relating to ignition timing control will be described. The arithmetic unit 168 calculates an estimated torque based on the actual degree of throttle opening and the valve timing realized by the above described air amount control. The term "estimated torque" as used in the present description refers to torque that can be output in a case where the ignition timing is set to the optimal ignition timing based on the current degree of throttle opening and valve timing and the target air-fuel ratio. The arithmetic unit 168 first calculates an estimated air amount based on a measured value of the degree of throttle opening and a measured value of the valve timing using a forward model of the aforementioned air model. The estimated air amount is an estimated value of an air amount that is actually realized by the current degree of throttle opening and valve timing. Next, the arithmetic unit 168 converts the estimated air amount to an estimated torque using the torque-air amount conversion map. The target air-fuel ratio is used as a search key when searching the torque-air amount conversion map.

The immediate torque and the estimated torque are inputted to the arithmetic unit 170. The arithmetic unit 170 calculates an indicated ignition timing efficiency that is an indicated value of the ignition timing efficiency based on the immediate torque and the estimated torque. The indicated ignition timing efficiency is expressed as a proportion of the immediate torque with respect to the estimated torque. However, an upper limit is defined for the indicated ignition timing efficiency, and the value of the indicated ignition timing efficiency is set as 1 in a case where the proportion of the immediate torque with respect to the estimated torque exceeds 1. The indicated ignition timing efficiency is described as "ηi" in the drawings.

The arithmetic unit 172 calculates the ignition timing based on the indicated ignition timing efficiency. More specifically, the arithmetic unit 172 calculates the optimal ignition timing based on engine status amounts such as the engine speed, the requested torque and the air-fuel ratio, and calculates a retardation amount with respect to the optimal ignition timing based on the indicated ignition timing efficiency. When the indicated ignition timing efficiency is 1, the retardation amount is set as zero, and the retardation amount is progressively increased as the indicated ignition timing efficiency decreases from 1. The arithmetic unit 172 then calculates the result of addition of the retardation amount to the optimal ignition timing as a final ignition timing. A map in which the optimal ignition timing and various engine status amounts are associated can be used to calculate the optimal ignition timing. A map in which the retardation amount, the ignition timing efficiency and various engine status amounts are associated can be used to calculate the retardation amount. The target air-fuel ratio is used as a search key to search these maps. The ignition timing is described as "SA" in the drawings. The ignition timing calculated by the arithmetic unit 172 is converted to a signal for driving the ignition device 8, and the signal is sent to the ignition device 8.

Next, the functions of the arithmetic unit relating to fuel injection amount control will be described. For each cylinder, the arithmetic unit 174 calculates a fuel injection amount, that is, a fuel supply amount, that is required to achieve the requested air-fuel ratio based on the requested air-fuel ratio and the estimated air amount. The estimated air amount is an air amount that is predicted to arise at a timing at which the intake valve closes, and is calculated based on the degree of throttle opening and the valve timing using a forward model of the aforementioned air model. The fuel injection amounts for the respective cylinders that are calculated by the arithmetic unit 174 are converted to signals for driving the injector 4, and the signals are sent to the injector 4. The arithmetic unit 174 corresponds to second actuator control means according to the present invention.

Next, the functions of the arithmetic units relating to EGR control will be described. The future air-fuel ratio is inputted to the arithmetic unit 180. The arithmetic unit 180 corresponds to target EGR rate calculation means according to the present invention, and calculates a target EGR rate for optimizing exhaust emissions or fuel consumption or the like using the future air-fuel ratio. Note that, in the present invention, the EGR rate refers to the proportion that EGR gas occupies with respect to air that is drawn into cylinders from the intake valve, and an EGR amount that shows the amount of EGR gas drawn into the cylinders from the intake valve is within an equal range to the EGR rate in the present invention.

The arithmetic unit 180 calculates the target EGR rate using an EGR rate map. The EGR rate map is a map in which the EGR rate is associated with engine status amounts including the engine speed, the air amount and the air-fuel ratio as keys. This map is determined by adaptation for each air amount, engine speed, and air-fuel ratio. Actual values or target values of the engine status amounts are used to search the EGR rate map. With regard to the air-fuel ratio, the future air-fuel ratio is used to search the map. Accordingly, at the arithmetic unit 180, the EGR rate that is required under the target air-fuel ratio is calculated as the target EGR rate. In the drawings, the target EGR rate is described as "EGRt".

Further, a first flag signal and a second flag signal are inputted to the arithmetic unit 180. The arithmetic unit 180 performs a calculation to obtain the target EGR rate that is described later in a case where the first flag signal and the second flag signal are both "on".

The arithmetic unit 182 calculates a target EGR valve degree of opening that is a target value of the degree of opening of the EGR valve based on the target EGR rate. A map or a formula that is obtained as the result of modeling the response of the EGR rate with respect to operation of the EGR valve based on hydrodynamics or the like can be used for calculating the target EGR valve degree of opening. Note that, since the EGR rate is influenced by the engine speed and the air amount, those are used as parameters for calculating the target EGR valve degree of opening. The target EGR valve degree of opening is described as "EGRv" in the drawings. The target EGR valve degree of opening that is calculated by the arithmetic unit 182 is converted to a signal for driving the EGR valve 6, and the signal is sent to the EGR valve 6. The arithmetic unit 182 corresponds to third actuator control means according to the present invention. Note that, a duty ratio of a solenoid that drives the EGR valve 6, and not the degree of opening of the EGR valve, may also be adopted as the operation amount of the EGR valve 6.

The foregoing is the fundamental logic of the ECU according to the present embodiment. Next, the characteristic logic of the ECU according to the present embodiment will be described using the drawings.

In the ECU according to the present embodiment, when the combustion mode is to be switched from the stoichiometric mode to the lean mode, the air-fuel ratio is gradually changed so that a torque level difference does not arise. However, when the air-fuel ratio is gradually changed at the time of switching the combustion mode, an increase in the amount of NOx emissions becomes a problem. That is, there is a tendency for the amount of NOx emissions to reach a peak at a slightly lean air-fuel ratio of around 16, and thereafter decrease as the air-fuel ratio changes toward the lean side. Consequently, if the air-fuel ratio is gradually changed from the stoichiometric air-fuel ratio to a lean air-fuel ratio, the air-fuel ratio must pass through an air-fuel ratio region in which the amount of NOx emissions is large, and a deterioration in the exhaust performance becomes a problem.

A feature of the ECU according to the present embodiment is with respect to logic that suppresses an increase in the amount of NOx emissions that arises due to the aforementioned switching of the combustion mode utilizing EGR. Specifically, the amount of NOx emissions decreases as the result of a drop in the combustion temperature that is caused by EGR. Therefore, in a case where the combustion mode is to be switched from stoichiometric combustion to lean combustion, the ECU of the present embodiment performs processing to increase the EGR prior to switching of the air-fuel ratio. It is thereby possible to switch the combustion mode while suppressing the amount of NOx emissions.

However, the responsiveness of EGR control is poor. Consequently, when it is attempted to execute the above described EGR control at a transient time at which the target torque changes at a fast rate, the time period required for switching of the combustion mode is prolonged, and on the contrary there is a risk that the control will lead to an increase in the amount of NOx emissions and an increase in the ignition retardation amount. Therefore, it is desirable that the aforementioned EGR control is performed at a time of gradual deceleration at which the requested torque changes gradually or during steady-state operation.

Figure 3:
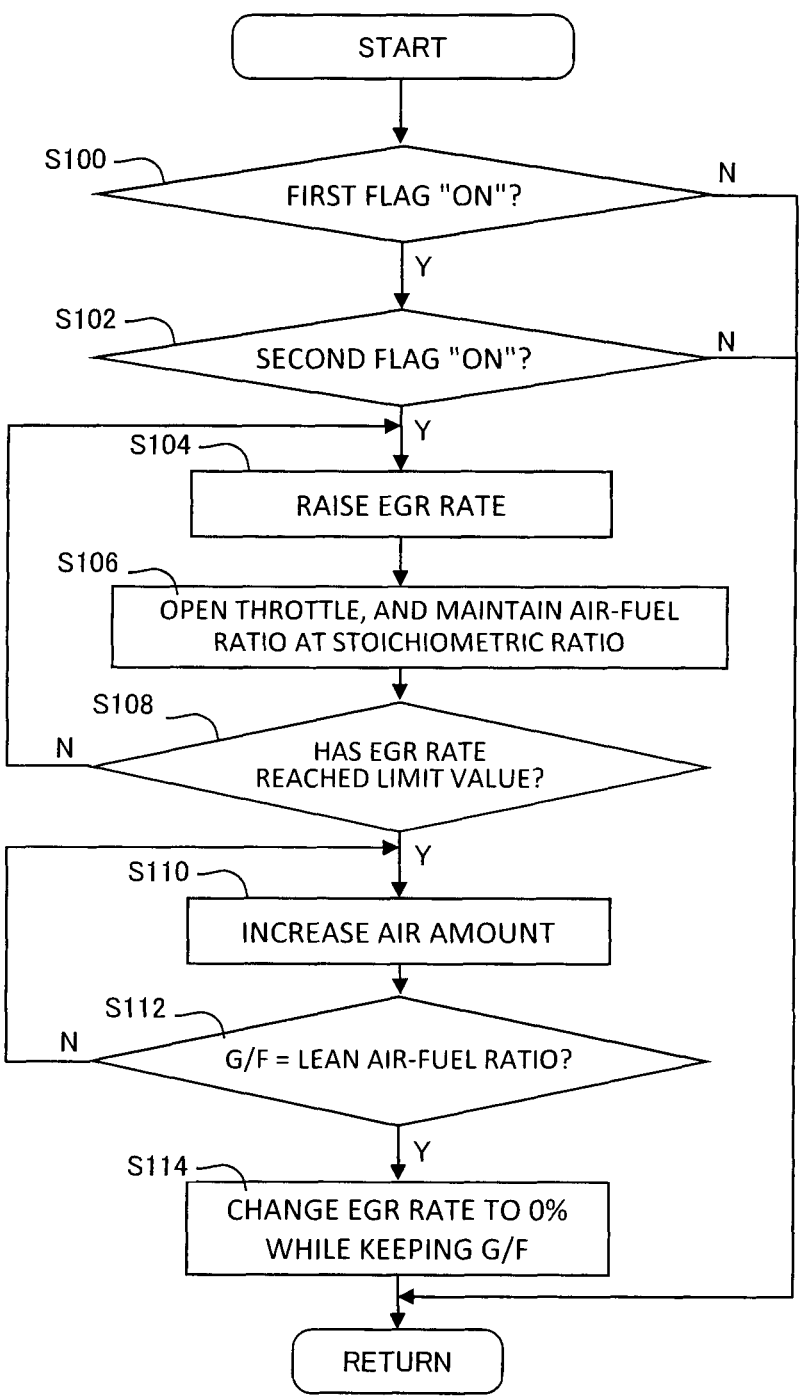
FIG. 3 is a flowchart illustrating a processing routine for switching a combustion mode that is executed in the first embodiment of the present invention.

Hereunder, operations for switching the combustion mode from the stoichiometric mode to the lean mode that the ECU according to the present embodiment performs during steady-state operation are described in detail using a flowchart. FIG. 3 is a flowchart illustrating a routine for switching the combustion mode from the stoichiometric mode to the lean mode that the ECU according to the present embodiment performs during steady-state operation. Note that it is assumed that the control routine shown in FIG. 3 is repeatedly executed during operation of the engine 10.

According to the routine shown in FIG. 3, first, it is determined whether or not the first flag that indicates that switching from the stoichiometric mode to the lean mode is in progress is set to "on" (step S100). If the result determined in the aforementioned step S100 is that the first flag is "off", the present routine is swiftly ended. In contrast, if the result determined in step S100 is that the first flag is "on", the processing shifts to the next step to determine whether or not the second flag that indicates that an amount of change in the requested torque is equal to or less than a predetermined value is "on" (step S102). If the result determined in the aforementioned step S102 is that the second flag is "off", it is determined that the current state is a state at a transient time and therefore the present routine is swiftly ended.

In contrast, if the result determined in the aforementioned step S102 is that the second flag is "on", it is determined that the current operating state is a steady-state and the processing shifts to the next step, in which processing for raising the EGR rate is performed (step S104). In this case, specifically, in response to the fact that the first flag signal and the second flag signal are both "on", the arithmetic unit 180 increases the target EGR by a predetermined amount from the previous value and outputs the resulting target EGR value.

Next, the throttle is operated to the open side (step 106). Specifically, in response to the fact that the first flag signal and the second flag signal are both "on", the combustion switching request portion 122 maintains the future air-fuel ratio at the previous value thereof. As a result, the arithmetic unit 162 outputs the target air-fuel ratio that is maintained at the stoichiometric air-fuel ratio. As a result of the target EGR rate rising and the target air amount being maintained, the arithmetic unit 164 adjusts the target degree of throttle opening TA to the open side and outputs the adjusted value.

Next, it is determined whether or not the current target EGR rate that was set in the aforementioned step S104 is a limit value of the EGR rate that is determined based on the current operating conditions (step S108). The limit value is a limit value of the EGR rate that is previously determined from the viewpoint of misfiring and catalyst performance, and a value that is previously defined is read in for each operating condition. If it is determined as a result that the target EGR rate has not reached the limit value, the processing returns to the aforementioned step S104 in which the target EGR rate is further increased by a predetermined amount. By repeatedly executing the above described processing from step S104 to step S108, the EGR rate approaches the limit value of the EGR rate in a continuous manner in a state in which the actual air-fuel ratio is maintained at the stoichiometric air-fuel ratio.

Subsequently, when it is determined in the aforementioned step S108 that the target EGR rate has reached the limit value of the EGR rate, the processing shifts to the next step, in which the air amount is increased (step S110). In this case, specifically, in response to the target EGR rate reaching the limit value of the EGR rate, the arithmetic unit 180 maintains the target EGR rate at the limit value. Further, in response to the target EGR rate reaching the limit value of the EGR rate, the combustion switching request portion 122 outputs the future air-fuel ratio that was changed by a predetermined amount to the lean air-fuel ratio side. As a result, the target air amount that is calculated at the arithmetic unit 162 is changed in a direction in which the air amount increases in accordance with a change in the target air-fuel ratio. Note that the amount of change in the future air-fuel ratio is set in a range in which it is possible for the actual air amount to adequately track the target air amount.

Next, it is determined whether or not a gas-fuel ratio (G/F) has become an equal value to the value of the lean air-fuel ratio that is taken as the target (target lean air-fuel ratio) (step S112). The gas-fuel ratio (G/F) mentioned here represents a ratio between gas that flows into the cylinders (i.e. fresh air+EGR gas) and a fuel injection amount into the relevant cylinders. As a result, in a case where it is determined that the gas-fuel ratio (GIF) has not become an equal value to the value of the target lean air-fuel ratio, the processing shifts to step S110 again and the air amount is increased. By repeatedly executing the above described processing from step S110 to step S112, the actual air-fuel ratio approaches the lean air-fuel ratio in a continuous manner in a state in which the EGR rate is maintained at the EGR limit value. Subsequently, when it is determined in the aforementioned step S112 that the gas-fuel ratio (G/F) has reached an equal value to the value of the lean air-fuel ratio that is taken as the target, the processing shifts to the next step, in which processing is performed to lower the target EGR rate to 0% while maintaining the gas-fuel ratio (G/F) at the value of the lean air-fuel ratio (step S114). In this case, specifically, in response to the gas-fuel ratio (G/F) reaching an equal value to the value of the lean air-fuel ratio that is taken as the target, the combustion switching request portion 122 and arithmetic units 180 and 162 calculate the respective outputs thereof so that the EGR rate decreases in a continuous manner within a range in which it is possible for the actual air amount to adequately track the target air amount while maintaining the gas-fuel ratio (G/F).

As described in the foregoing, according to the control device of the first embodiment, the air-fuel ratio is changed in a continuous manner from the stoichiometric air-fuel ratio to a lean air-fuel ratio in a state in which the EGR rate is maintained at the limit value of the EGR rate. It is thereby possible to switch the combustion mode from stoichiometric combustion to lean combustion while suppressing the amount of NOx emissions.

FIG. 4 is a time chart that illustrates an image of results of control for switching the combustion mode from stoichiometric combustion to lean combustion according to the present embodiment. In FIG. 4 a chart on a first tier illustrates changes over time in the torque. The target torque and actual torque are shown in this chart. A chart on a second tier illustrates changes over time in the degree of throttle opening. A chart on a third tier illustrates changes over time in the air amount. The target air amount KLt and the actual air amount are shown in this chart. A chart on a fourth tier illustrates changes over time in the ignition timing efficiency. A chart on a fifth tier illustrates changes over time in the ignition timing. A chart on a sixth tier illustrates changes over time in the air-fuel ratio. The future air-fuel ratio and the actual air-fuel ratio are shown in this chart. A chart on a seventh tier illustrates changes over time in the EGR rate. The target EGR rate EGRt and the actual EGR rate are shown in this chart. Further, in this chart an EGR rate that corresponds to the EGR limit is represented by a chain double-dashed line. A chart on an eighth tier illustrates changes over time in the gas-fuel ratio. Lastly, a chart on a ninth tier illustrates changes over time in the fuel injection amount.

According to this time chart, when it is determined at a time t1 that the first flag and the second flag are "on", the target EGR rate is caused to increase in a continuous manner. During this period, as the result of maintaining the future torque, the target air amount and the requested air-fuel ratio at the respective values thereof for a time of stoichiometric combustion, the degree of throttle opening TA is caused to gradually increase.

Upon the target EGR rate reaching the EGR limit at a time t2, the target EGR rate is maintained at the value of the EGR limit. During this period, the requested air-fuel ratio is caused to change in a continuous manner to the lean air-fuel ratio side, and the target air amount is also increased. Note that, since the target air amount during this period is caused in increase in a range that does not diverge from the actual air amount, the indicated ignition timing efficiency $\eta i$ is substantially maintained at 1, and retardation control of the ignition timing is not performed.

Upon the gas-fuel ratio (G/F) reaching a value equal to the lean air-fuel ratio at the time of operation in the lean mode at a time t3, the target EGR rate is caused to decrease in a continuous manner. During this period, since the gas-fuel ratio is maintained at a constant value, the target air amount and the requested air-fuel ratio approach the respective values thereof at the time of operation in the lean mode in a continuous manner. Subsequently, when the target EGR rate reaches 0% at a time t4, the target air amount and the requested air-fuel ratio each reach the respective values thereof at the time of operation in the lean mode, and thus switching from the stoichiometric mode to the lean mode is completed.

Note that, in the control device of the first embodiment that is described above, the future air-fuel ratio corresponds to "target air-fuel ratio" of the present invention, the combustion switching request portion 122 corresponds to "target air-fuel ratio switching means" of the present invention, the arithmetic unit 162 corresponds to "target air amount calculation means" of the present invention, the arithmetic unit 180 corresponds to "target EGR rate calculation means" of the present invention, the arithmetic unit 164 corresponds to "first actuator control means" of the present invention, the arithmetic unit 174 corresponds to "second actuator control means" of the present invention, and the arithmetic unit 182 corresponds to "third actuator control means" of the present invention. Further, in the control device of the first embodiment described above, "restriction means" of the present invention is realized by the ECU executing the processing in the above described step S102. Furthermore, "first means" of the present invention is realized by the ECU executing the processing in the above described steps S100 and S104. In addition, "second means" of the present invention is realized by the ECU executing the processing in the above described steps S100 and S106. Further, "second means" of the present invention is realized by the ECU executing the processing in the above described steps S108 and S110. In addition, "first means" of the present invention is realized by the ECU executing the processing in the above described steps S112 and S114.

Other Embodiments

The present invention is not limited to the above described embodiment, and various modifications can be made without departing from the spirit and scope of the present invention. For example, the modifications described hereunder may be adopted.

According to the logic adopted in the present embodiment, when switching from the stoichiometric mode to the lean mode during steady-state operation, the EGR rate is increased up to the limit value of the EGR rate prior to switching of the air-fuel ratio. However, the EGR rate need not necessarily be increased up to the limit value, and it is sufficient to appropriately set the switching-time target EGR rate based on the relation with the amount of NOx emissions.

The air-fuel ratio (virtual air-fuel ratio) that is used for calculating a target air amount in the embodiment can be replaced with an equivalence ratio. The equivalence ratio is also a parameter that provides a conversion efficiency of the air amount to torque, and corresponds to a parameter that corresponds to the air-fuel ratio. Likewise, an excess air factor can be used as a parameter that provides a conversion efficiency of the air amount to torque.

The first air-fuel ratio is not limited to the theoretical air-fuel ratio. A configuration can also be adopted in which the first air-fuel ratio is set to an air-fuel ratio that is leaner than the theoretical air-fuel ratio, and the second air-fuel ratio is set to an air-fuel ratio that is leaner than the first air-fuel ratio.

According to the logic adopted in the present embodiment, when the gas-fuel ratio (G/F) reaches an equal value to the lean air-fuel ratio at the time of operation in the lean mode, the target EGR rate is caused to decrease in a continuous manner to 0%. However, a value that is the target of a decrease of the target EGR rate is not limited to 0%, and it is sufficient to cause the target EGR rate to decrease to a target EGR rate that corresponds to the operating conditions at the time that the lean air-fuel ratio is switched to.

REFERENCE SIGNS LIST

2 Throttle
4 Injector
6 EGR valve
8 Ignition device
100 Engine controller
200 Powertrain manager
180 Arithmetic unit as target EGR rate calculation means
162 Arithmetic unit as target air amount calculation means
164 Arithmetic unit as first actuator control means
174 Arithmetic unit as second actuator control means
182 Arithmetic unit as third actuator control means
122 Arithmetic unit as target air-fuel ratio switching means

The invention claimed is:

1. A control device for an internal combustion engine that is configured to be capable of selecting operation according to a first air-fuel ratio and operation according to a second air-fuel ratio that is leaner than the first air-fuel ratio, comprising:
first means for, in a case where a condition for switching an operation mode from the operation according to the first air-fuel ratio to the operation according to the second air-fuel ratio is satisfied, controlling the internal combustion engine so as to increase an EGR rate in a continuous manner up to a switching-time target EGR rate; and
second means for, in a case where the condition is satisfied, controlling the internal combustion engine so as to maintain an air-fuel ratio at the first air-fuel ratio until the EGR rate reaches the switching-time target EGR rate, and in response to the EGR rate reaching the switching-time target EGR rate, to cause the air-fuel ratio to change in a continuous manner from the first air-fuel ratio towards the second air-fuel ratio.

2. The control device for an internal combustion engine according to claim 1, wherein the first means comprises means for controlling the internal combustion engine so that, in response to a gas-fuel ratio reaching an equal value to a value of the second air-fuel ratio, the internal combustion engine causes the EGR rate to decrease in a continuous manner from the switching-time target EGR rate while maintaining the gas-fuel ratio at the value of the second air-fuel ratio.

3. The control device for an internal combustion engine according to claim 1, wherein:
the second means comprises:
target air-fuel ratio switching means for switching a target air-fuel ratio from the first air-fuel ratio to the second air-fuel ratio in response to the condition being satisfied,
target air amount calculation means for back-calculating a target air amount for achieving a target torque based on the target air-fuel ratio from the target torque,
first actuator control means for determining an operation amount of a first actuator that changes an amount of air that is drawn into a cylinder based on the target air amount, and operating the first actuator in accordance with the operation amount, and
second actuator control means for determining a fuel supply amount based on the target air-fuel ratio, and operating a second actuator that supplies fuel into a cylinder in accordance with the fuel supply amount; and
the target air-fuel ratio switching means is configured so as to, in a case where the condition is satisfied, maintain the target air-fuel ratio at the first air-fuel ratio until the EGR rate reaches the switching-time target EGR rate, and to cause the target air-fuel ratio to change in a continuous manner from the first air-fuel ratio towards the second air-fuel ratio in response to the EGR rate reaching the switching-time target EGR rate.

4. The control device for an internal combustion engine according to claim 3, wherein:
the first means comprises:
target EGR rate calculation means for calculating a target EGR rate in accordance with an operating condition of the internal combustion engine, and
third actuator control means for determining an operation amount of a third actuator that adjusts the EGR rate based on the target EGR rate, and operating the third actuator in accordance with the operation amount; and
the target EGR rate calculation means is configured so as to increase the target EGR rate in a continuous manner up to the switching-time target EGR rate in response to the condition being satisfied.

5. The control device for an internal combustion engine according to claim 4, wherein:
the target EGR rate calculation means is configured so as to decrease the target EGR rate in a continuous manner from the switching-time target EGR rate in response to a gas-fuel ratio reaching an equal value to the second air-fuel ratio; and the target air-fuel ratio switching means is configured so as to, in response to the gas-fuel ratio reaching an equal value to the second air-fuel ratio, change the target air-fuel ratio within a range from the first air-fuel ratio to the second air-fuel ratio so that the gas-fuel ratio is maintained at the second air-fuel ratio.

6. The control device for an internal combustion engine according to claim 1, wherein the switching-time target EGR rate is an EGR rate that corresponds to an EGR limit.

7. The control device for an internal combustion engine according to claim 1, further comprising restriction means for restricting control by the first means in a case where a condition that an amount of change in a target torque is equal to or less than a predetermined value is not satisfied.

8. A control device for an internal combustion engine that is configured to be capable of selecting operation according to a first air-fuel ratio and operation according to a second air-fuel ratio that is leaner than the first air-fuel ratio, comprising an engine controller programmed to:

in a case where a condition for switching an operation mode from the operation according to the first air-fuel ratio to the operation according to the second air-fuel ratio is satisfied, control the internal combustion engine so as to increase an EGR rate in a continuous manner up to a switching-time target EGR rate; and in a case where the condition is satisfied, control the internal combustion engine so as to maintain an air-fuel ratio at the first air-fuel ratio until the EGR rate reaches the switching-time target EGR rate, and in response to the EGR rate reaching the switching-time target EGR rate, to cause the air-fuel ratio to change in a continuous manner from the first air-fuel ratio towards the second air-fuel ratio.

* * * * *